United States Patent [19]
Wood et al.

[11] Patent Number: 4,575,190
[45] Date of Patent: Mar. 11, 1986

[54] HERMETIC ELECTRO-OPTIC DISPLAY CELL

[75] Inventors: John C. Wood, Eastleigh; Anthony C. Lowe, Braishfield; Barry F. Dowden, Romsey, all of England

[73] Assignee: International Business Machines Corporation, Armonk, N.Y.

[21] Appl. No.: 560,050

[22] Filed: Dec. 9, 1983

[30] Foreign Application Priority Data

Dec. 30, 1982 [EP] European Pat. Off. ........ 82306991.9

[51] Int. Cl.$^4$ .............................................. G02F 1/17
[52] U.S. Cl. .................................... 350/357; 350/343; 350/344; 428/1
[58] Field of Search ............... 350/356, 357, 343, 344; 427/123, 124, 126.1, 250; 428/1

[56] References Cited

U.S. PATENT DOCUMENTS 4,183,631  1/1980  Kondo et al. ........................ 350/357
4,436,378  3/1984  Kirkman ............................. 350/345

FOREIGN PATENT DOCUMENTS 2505069  11/1982  France .
53-93047  8/1978  Japan .

*Primary Examiner*—Norman Morgenstern
*Assistant Examiner*—Kenneth Jaconetty
*Attorney, Agent, or Firm*—Yen S. Yee; Alexander Tognino

[57] ABSTRACT

A hermetic electro-optic display cell has an enclosure for a liquid electrolyte comprising a wall of a plastics material, a lower inorganic base and an upper window both of which are impervious to the electrolyte. Impervious gasket means seals at least the lower edges of the wall to the base when clamped together. To render the wall hermetic an inorganic coating is provided around the exterior faces and along the edges at least as far as the gasket means. Metal is the preferred coating except for transparent faces where silica may be employed.

8 Claims, 8 Drawing Figures

HERMETIC ELECTRO-OPTIC DISPLAY CELL

TECHNICAL FIELD OF THE INVENTION

This invention relates to hermetic electro-optic display cells.

BACKGROUND ART

It has long been recognised that liquid filled electro-optic displays cells such as electrochromic, electrophoretic or liquid crystal displays must be hermetically sealed so that liquid can neither permeate from the cell nor gas permeate into the cell. The general principles of construction of liquid filled electrochromic displays is described in an article by J Bruinink entitled "Electrochromic Display Devices" (Nonemissive Electro-optic Displays, Ed. A R Kmetz, F K von Willisen, March 1976, p211). This article describes a sandwich type cell construction in which a glass front plate and a glass or steel rear plate are separated by a spacer of glass or a plastics material. Sealing of the spacers and of a filling hole with epoxy resin, glass frit or polymers is mentioned. The purpose is to render the cell hermetic to prevent leakage of oxygen into the cell.

An alternative method of sealing is shown in published French patent application No. 2,505,069 in which a peripheral gasket between two plates of a sandwich type cell is compressed by an external clip acting on the plates. The cell may be additionally externally coated with resin or varnish.

Yet another similar type of sandwich cell construction has been described in published British patent application No. 2,046,935A. This shows a double glass plate cell construction which is sealed at the edges by a double epoxy resin seal, the inner portion of which is cured by reaction with the electrolyte. This publication also lists, among the general requirements of a sealant, that it should have "low permeability against penetration by the electrolyte from the inside and by gases or liquids from the outside".

Japanese published patent application No. 53-93047 shows a similar structure in which the sealant forms an outer wall. A metal film is vapor deposited over the sealant outer wall and also over the edges of the cell base plates in order to prevent moisture in the air from entering the inside of the liquid crystal cell concerned.

In U.S. Pat. No. 4,183,631, a glass topped electrochromic cell with a nickel base has an intermediate side wall made of a polypropylene block. A layer of epoxy resin on the outside of the side wall renders the cell air and water tight.

In allowed U.S. patent application Ser. No. 307,914, U.S. Pat. No. 4,436,378 (also published as European patent application No. 55317-A1), a rather more complex construction of electrochromic cell is described for use in a projection display. To accommodate various features associated with projection, such as an integral side light guide and inwardly sloping outer walls, portions of which are silvered, the entire side wall portion of the cell is moulded from an acrylic plastics material. The transparent cell cover is also acrylic. Although not explicitly described, the cover, side wall and base are bonded together with adhesive. The provision of complex cell wall features, such as the side light guide, is facilitated by the much greater cell depth which can be employed with an electro-chromic cell as opposed to a liquid crystal cell.

DISCLOSURE OF THE INVENTION

It has been discovered that the cell described in allowed U.S. patent application Ser. No. 307,914 U.S. Pat. No. 4,436, 378 is not adequately hermetic over an extended period. Permeation of liquid through the cell wall and of gas inwardly results in the formation of bubbles in the display chamber which distort or obscure the displayed image and, ultimately, interfere with the operation of the cell. Even when the acrylic cell cover was replaced with a glass cover, hermeticity was still found to be insufficient. The prior art has not therefore provided a display cell, employing plastic moulded construction, which is adequately hermetic over a period of years and which does not employ adhesives or resin seals which can react with the liquid contained in the cell.

Accordingly, the present invention provides a hermetic electrooptic display cell having an enclosure for a liquid electrolyte, the enclosure comprising a wall of a plastics material; a lower inorganic base, substantially impervious to the electrolyte, upon which a plurality of display electrodes is disposed, within the enclosure wall; an upper window, also substantially impervious to the electrolyte, by way of which the display electrodes are viewed or projected; and impervious gasket means for sealing at least the lower wall edges to the base; the cell further comprising clamp means for clamping the wall and base together to effect the gasket seal; and an inorganic coating around the exterior face of the wall and along the wall edges at least as far as the gasket means, which coating is sufficiently thick to render the wall substantially impervious to the electrolyte.

By employing a relatively thick inorganic coating around all faces of the plastics wall portion of the enclosure which are susceptible to leakage, the major portion of the enclosure can be made by relatively cheap and simple plastics moulding techniques. The additional use of impervious gaskets to seal the enclosure portions together overcomes another disadvantage of the prior art cells discussed above, namely the tendency of any adhesive used to react with or contaminate the electrolyte and thus interfere with display function.

It is only necessary that the inorganic coating extend inwardly along the wall edges as far as the gasket. A coating extending beyond the gasket may slightly improve the hermeticity but must not react with or be soluble in the electrolyte.

The preferred inorganic coating is metal, specifically electroplated copper. The reflective silvering of allowed U.S. patent application Ser. No. 307,914 U.S. Pat. No. 4,436,378 may be remained for optical reasons and used as a cathode layer for the copper plating. It should be noted that the the thickness of evaporated silver necessary to reflect light is typically 2000–4000Å and this is inadequate to afford a seal because of pinholing. Electroplating the bulk of the coating is faster than evaporation and does not heat the plastic. Furthermore, electroplated copper is stress free and ductile.

The preferred construction employs an acrylic plastics material which has been precleaned to remove residual monomer. Cleaning may be carried out with Analar propan-2-ol or with a fluorocarbon solvent. The clean material is coated with a relatively thin evaporated silver lower layer and a relatively thick electroplated copper over layer of up to 25 microns. A top layer of tin may also be employed to protect the copper from corrosion.

Clearly, metallic layers cannot be used to seal those surfaces which must be transparent for optical reasons and various alternatives are available. These include coating of the transparent surfaces with silica. Silica can be employed as an alternative to metal for coating the other surfaces of the cell, particularly if other plastics such as polycarbonate are being used. A suitable process for applying a silica coating is by vacuum deposition or sputtering, e.g. of silicon monoxide in an oxygen rich atmosphere.

The preferred construction of cell however employs metal coating only and a glass cover window sealed to the plastics wall portion by an additional impervious gasket. Metallisation of not only acrylic but also polycarbonate and polystyrene has been achieved.

Where one of the transparent surfaces is, for example, the input face of a side light guide of the type described in allowed U.S. patent application Ser. No. 307,914, U.S. Pat. No. 4,436,378 the bulk of the guide compared to the remaining wall thickness may be sufficient to reduce permeation to acceptable levels without any coating of the input face. The side faces of the guide, however, must be coated.

The invention will now be described, by way of example, with reference to a preferred embodiment thereof as illustrated in the following drawings.

DETAILED DESCRIPTION

Figure 1:
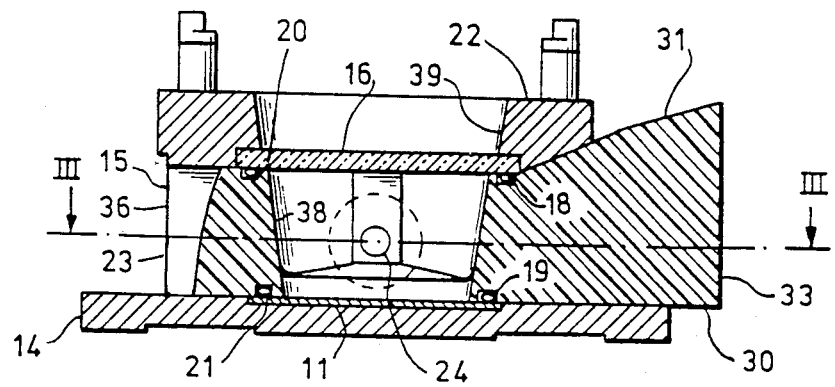
FIG. 1 is a side sectional view on the line I—I of FIG. 2 through a hermetic electro-optic display cell according to the present invention.
Figure 2:
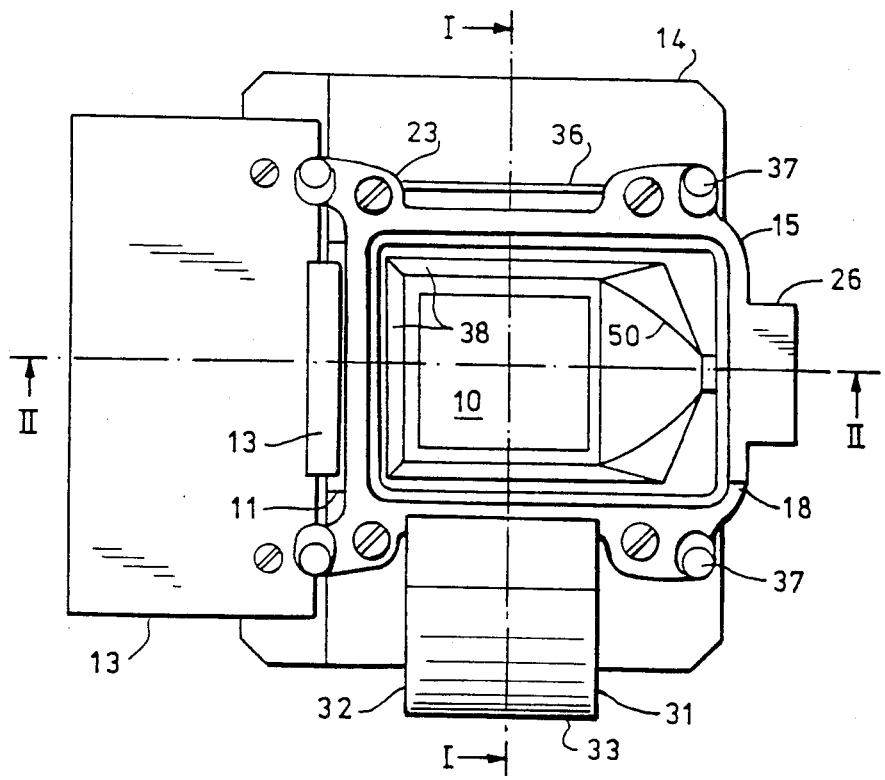
FIG. 2 is a plan view of the display cell of FIG. 1 with clamp plate and coverglass removed.

With reference to FIGS. 1 and 2, the hermetic display cell shown is an electrochromic display, employing viologen in aqueous solution as the electrochromic material. The viologen is a mixture of 1,1' di-heptyl 4,4' bipyridinium phosphate and hypophosphite as described in U.S. Pat. No. 4,187,003. The display is a matrix-addressable display in which a rectangular array 10 of silver display electrodes are formed on the upper surface of a silicon chip 11 which forms the base of the cell enclosure.

Each of the array of electrodes is connected to one of an underlying matrix of field-effect transistors formed in the chip 11 by integrated circuit techniques. The electrode/transistor matrix is made as described in commonly assigned U.S. patent application Ser. No. 560,051, filed Dec. 9, 1983 for a "Semiconductor Integrated Display and Method of Making Same" to which reference may be made for further details. External electrical connection of the chip 11 is by means of a multiwire cable 12. This connects pads, not shown, at one end of chip 11 which protrudes beyond the enclosure, to a printed circuit board 13. Details of the electrical operation of the matrix display are given in our allowed U.S. patent application Ser. No. 259,268, U.S. Pat. No. 4,426,643 also published as European patent application No. 42893-A1.

Since the chip 11 is fragile, it is supported by a heavy aluminium base 14 to which the printed circuit board 13 is also bolted. The side wall of the enclosure is formed by a frame 15 moulded from an acrylic plastics material, polymethyl methacrylate. The frame is a relatively complex shape as it includes many features connected with the filling and sealing of the cell and also with the optical aspects of the display, as will be described.

Figure 3:
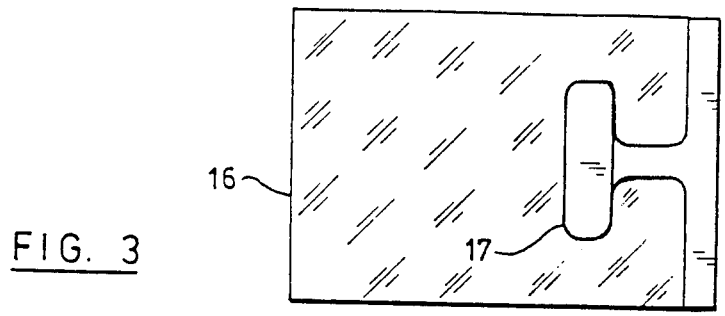
FIG. 3 is plan view of the cover glass of the display cell of FIG. 1.

The top cover of the liquid enclosure of the cell is a glass plate 16, shown in FIG. 3, which rests on top of the frame 15. The glass cover 16 has deposited thereon, a counter electrode 17 of platinum black electrodeposited on a conductor pattern comprising gold over a titanium adhesion layer.

Figure 4:
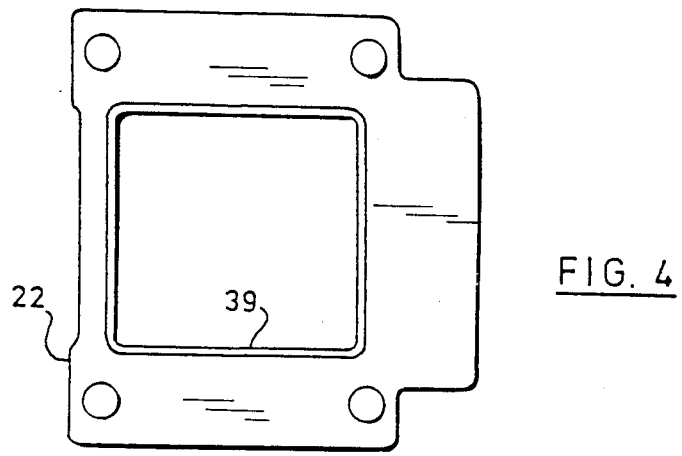
FIG. 4 is a plan view of the clamp plate of the display cell of FIG. 1.

To seal the glass cover 16 to the frame 15, and the frame to the chip 11, the frame is provided with two grooves 18 and 19 around the upper and lower edges of its walls. In each of these grooves are O-ring gaskets 20 and 21 made of an inert, impervious fluorocarbon polymer. The gaskets are compressed by means of a clamp plate 22, shown in FIG. 4 which is bolted down onto the glass plate 16 by four nuts 23 which engage threaded pins set into the base.

The above described components constitute a complete liquid enclosure for the display cell except for a filling orifice 24 in one wall of the frame 15. This orifice is sealed, as will be described in connection with FIGS. 6-8, by a flexible diaphragm 25, also made of an inert fluorocarbon polymer, which is seated in a housing 26.

Figure 5:
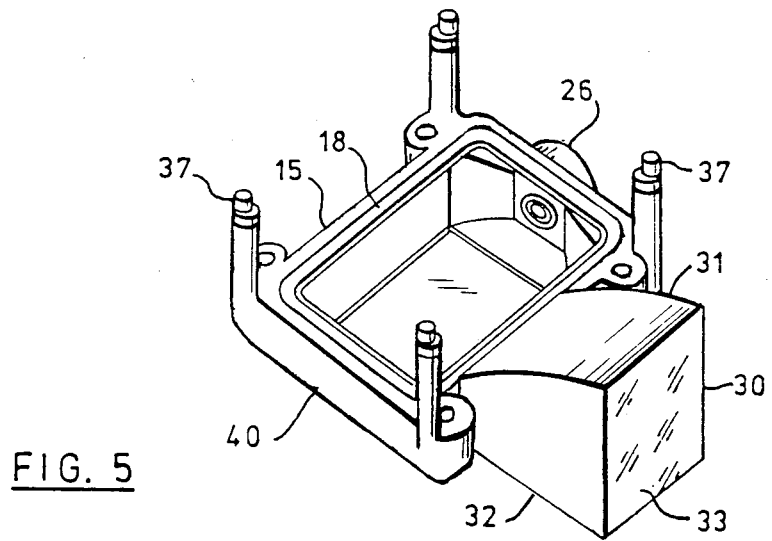
FIG. 5 is a perspective view of a moulded frame forming the side wall structure of the cell of FIG. 1.

The remaining features of the frame 15 relate predominantly to the optical arrangements for projecting the displayed image onto a screen. A prominent feature (ref. FIGS. 1 and 5) is a side light guide 30 in the form of a multi-facetted truncated wedge. The guide 30 is integral with the frame 15 and forms one wall thereof. Its upper facets 31 and also its side faces 32 must be silvered for optical reasons to direct light into the cell but, of course, its input face 33 must be transparent.

The outer face of the opposite wall 36 of the frame is also facetted and silvered to reflect escaping projection light back into the cell to increase illumination of display area 10. Because the silver electrodes constituting area 10 have matt surfaces, light from them is scattered randomly and a proportion emerges from the top of the cell through the window 16. This light reaches a projection lens (not shown) whose mounting ring is registered on shoulders of four pillars 37 and is projected onto a screen (not shown). To reduce vignetting, the inner walls 38 of frame 15 slope outwardly from the display area, as do edges 39 of clamp plate 22. The optical arrangement of the display cell, lamp and projection lens is substantially the same as that described in allowed U.S. patent application Ser. No. 307,914, U.S. Pat. No. 4,436,378.

The acrylic material of which the frame 15 is formed is permeable to a limited extent to both cell liquid and to the atmosphere. Over a period of a few months, loss of cell liquid and formation of gas bubbles could severely impair the display function. For this reason, much of the external surface of the frame 15 is metallised to a sufficient thickness to render the package hermetic. The metallization consists of 2000Å of evaporated silver followed by 25 microns of electroplated copper, which has been found to be sufficient to close off the largest pinholes in the evaporated silver layer. An electroless top layer of 1500Å of tin protects the copper from corrosion.

Figure 6:
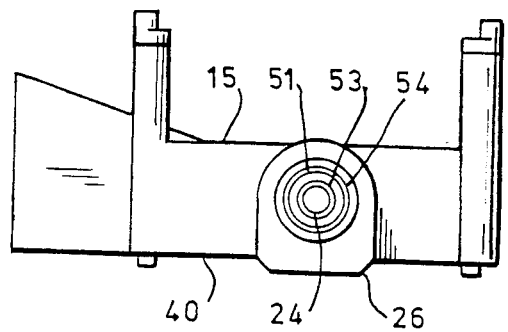
FIG. 6 is a rear elevation of the frame of FIG. 5 in which a filling orifice is visible.

The metallic sealing layer 40 is indicated by cross hatching in FIGS. 2, 5 and 6. Essentially, all exterior wall surfaces of the frame, except for the tops of pillars 37, are coated up to the O-ring grooves 18 and 19. Coating inwardly beyond the grooves is not necessary because of the seal afforded by the O-ring gaskets 20 and 21 and the impervious nature of glass cover plate 16 and silicon chip 11. It is also undesirable because of possible contamination of the viologen solution. The interior of diaphragm housing 26 is not coated as this will be sealed by diaphragm 25.

The input face 33 of light guide 30 is not coated, since transparency is essential, although all the other faces 31, 32, etc of the guide are coated. In the case of this particular design, the sheer bulk of the guide compared to the general wall thickness suffices to reduce permeation to acceptable levels. If this were not the case, a transparent coating of silica could be employed or a glass cover plate adhesively bonded to the face.

The process by which the frame 15 is coated will now be described. In order to obtain adhesion of the evaporated silver to the acrylic, an extensive cleaning cycle must be carried out. In particular all traces of mould release agent and pre-acrylic monomer must be removed.

This is achieved by, firstly, washing and scrubbing the moulded frame in 1% solution of a commercially available surfactant (DECON 90) which is a complex emulsion of highest quality anionic and nonionic surfaces active agents, stabilizing agents, alkalis and non-phosphate detergent builders in an aqueous base available from DECON laboratories, Ltd., of Hove, England and then rinsing in de-ionised water. The frame is next rinsed in analar propan-2-ol and dried in pure nitrogen after which it is placed in a vacuum chamber for 12–24 hours. This rinse, drying and evacuation cycle is repeated up to three times. Immersion time in propan-2-ol must be minimized particularly for moulded acrylic to avoid softening. If this is a problem, washing in a fluorocarbon solvent is an alternative. After pre-cleaning is complete, the frame is sufficiently clean to be transferred to an evaporator.

The frame is clamped in a jig which sits in the O-ring grooves 18 and 19 and which shields the interior of the frame from the evaporation. The base of the orifice in diaphragm housing 26 is temporarily plugged. After subjecting the frame to a glow discharge in a nitrogen atmosphere for final cleaning and adhesion promotion, the chamber is evacuated. A 2000Å layer of silver is then evaporated from a resistance source onto the cold frame. The frame is then turned to different orientations and the evaporation sequence, omitting the glow discharge, is repeated until all surfaces have been coated. The distance from source to substrate is from 300–400 mm. Continuous evaporation is not permitted for more than 30 seconds at a time to avoid undue heating of the plastics frame.

The silvered frame is now transferred to a copper electroplating bath containing 50 gm/l copper sulphate, 60 gm/l sodium potassium tartrate and ammonium hydroxide to raise the pH to 7.5. Electrical connection is made to the silver coating by means of a tapered plug which fits into a bore in housing 26. 25 microns of copper are plated at a current density of 1.08 Adm$^{-2}$ at room temperature under moderate air agitation. The copper deposit is uniform, pore-free and ductile.

Finally the frame is coated with 1500Å of tin in an electroless bath to protect the copper from corrosion. Before use, the frame is immersed in circulating de-ionised water for at least 12 hours to leach out any ions which may have penetrated the plastic during the plating processes.

The display cell is assembled as indicated in the above description by placing gaskets 20 and 21 in their respective grooves and clamping the chip 11, frame 15 and glass cover plate 16 together between clamp plate 22 and base 14 to form the cell enclosure.

The cell is then filled with the viologen electrolyte and sealed as will now be described with reference to FIGS. 6–8. Before it is filled the cell is purged with Argon.

Figure 7:
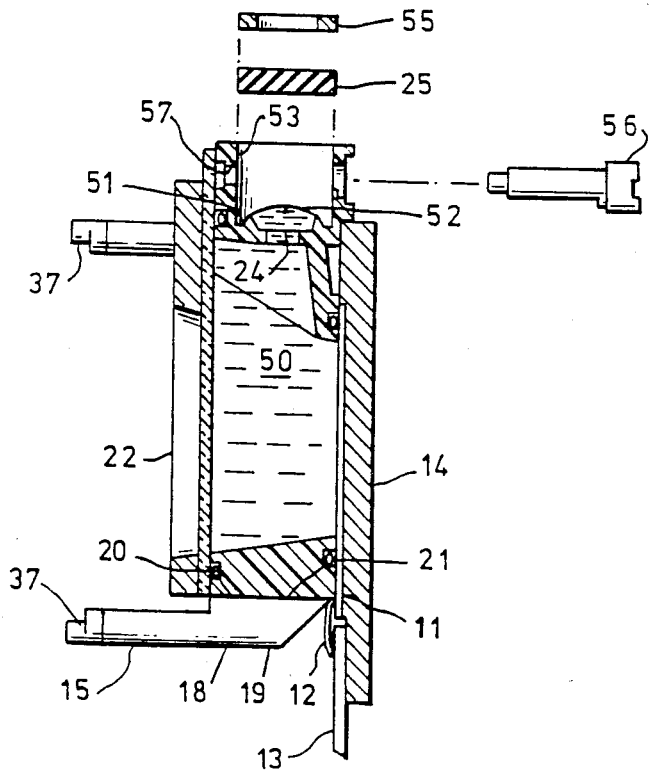
FIG. 7 is a side section through the cell of FIG. 1, taken on the line II—II of FIG. 2, showing the cell in partly disassembled state to illustrate the filling arrangement.
Figure 8:
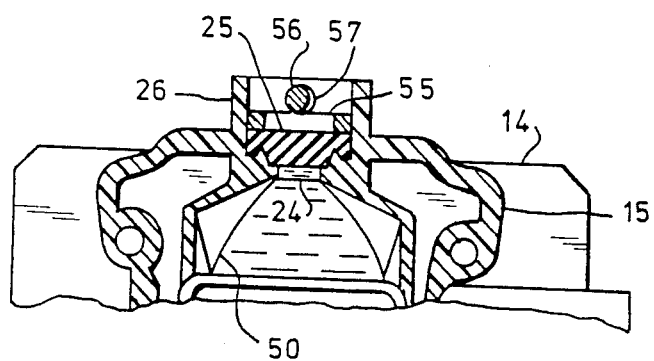
FIG. 8 is a section through a portion of the assembled cell, including the filling orifice, taken on the line III—III of FIG. 1.

In order to fill the cell, it is oriented approximately vertically as shown in FIG. 7, and filled slowly through a tube inserted through filling orifice 24 which is now located at the uppermost point of the enclosure. The interior walls of the enclosure form a tapering neck 50 to assist the escape of any bubbles. As shown in FIG. 7, on the outside of orifice 24 is a knife-edge annular rim 51 above which a convex meniscus 52 is formed. Care must be taken that excess electrolyte does not spill onto the exterior of the enclosure.

The sealing diaphragm 25 is lowered down a bore 53 in housing 26 until it rests on the knife edge 51. Any small excess of liquid is displaced into the surrounding gutter by the diaphragm without introduction of bubbles into the cell. An annular washer 55 is then placed over the diaphragm.

An eccentric pin 56 is then passed through a cross bore 57 in the housing 26. With its flattened side lowermost, the pin just clears the washer 55. The pin is then rotated to the position shown in FIG. 8. This rotation depresses the washer and compresses the diaphragm 25 onto the knife edge 51. The cell is now perfectly sealed. Additionally, because the diaphragm 26 is elastomeric and is not restrained in the centre, it can flex to accommodate differential thermal expansion of the liquid and enclosure.

We claim:

1. A hermetic electro-optic display cell having an enclosure for a liquid electrolyte, the enclosure comprising: side walls of a plastic moulded material;
    a lower inorganic base, substantially impervious to the electrolyte, upon which a plurality of display electrodes is disposed, within said side walls;
    an upper window, also substantially impervious to the electrolyte, by way of which the display electrodes are view or projected;
    impervious gasket means for sealing the lower edge of said side walls to said base and for sealing said upper window to the upper edge of said side walls;
    clamp means for clamping said side walls, said upper window and said base together to effect a gasket seal; and
    an inorganic coating around the exterior of said side walls and along said side wall edges at least at said gasket means, which coating is sufficiently thick to render said walls substantially impervious to the electrolyte.

2. A display cell as claimed in claim 1 in which the inorganic coating is metal.

3. A display cell as claimed in claim 2 in which at least the major proportion of the metal coating is copper.

4. A display cell as claimed in claim 3 in which the metal coating comprises a relatively thin evaporated silver lower layer and a relatively thick electroplated copper overlayer.

5. A display cell as claimed in claim 4 in which the metal coating also comprises a relatively thin top layer of tin.

6. A display cell as claimed in claim 2 in which the plastic moulded material is an acrylic polymer pre- cleaned to remove any residual monomer prior to coating the wall with metal.

7. A display cell as claimed in claim 2 in which the moulded material includes a light guide for directing illumination light onto the display image area, all the faces of the light guide being metal coated except for an input face being the face most remote from the liquid, the light guide being thicker than the remainder of the wall of the cell.

8. A display cell as claimed in claim 7 in which the inorganic coating is silica on all light transmitting faces of the enclosure which are made of plastics material and is metal on the other faces.

* * * * *